(12) United States Patent
Kluz et al.

(10) Patent No.: US 9,901,762 B2
(45) Date of Patent: *Feb. 27, 2018

(54) METHOD AND MECHANISM FOR FAST EVACUATION OF A PRESSURIZED VESSEL

(71) Applicant: Marotta Controls, Inc., Montville, NJ (US)

(72) Inventors: Krzysztof Kluz, Saddle Brook, NJ (US); James LaGrotta, Boonton Township, NJ (US); Christopher Modin, Morris Plains, NJ (US)

(73) Assignee: Marotta Controls, Inc., Montville, NJ (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/059,983

(22) Filed: Mar. 3, 2016

(65) Prior Publication Data

US 2016/0184620 A1    Jun. 30, 2016

Related U.S. Application Data

(63) Continuation of application No. 14/087,337, filed on Nov. 22, 2013, now Pat. No. 9,302,133.

(51) Int. Cl.
*A62C 31/02* (2006.01)
*A62C 37/40* (2006.01)
*A62C 37/46* (2006.01)
*A62C 13/64* (2006.01)
*F16K 31/06* (2006.01)
*A62C 3/07* (2006.01)

(52) U.S. Cl.
CPC .............. *A62C 37/40* (2013.01); *A62C 13/64* (2013.01); *A62C 37/46* (2013.01); *F16K 31/06* (2013.01); *A62C 3/07* (2013.01)

(58) Field of Classification Search
CPC ......... A62C 37/40; A62C 13/64; A62C 37/46; A62C 37/04; A62C 37/07; A62C 11/00; A62C 99/0009; B05B 1/30; B05B 1/32; F16K 31/06
USPC ........................................... 169/72
See application file for complete search history.

(56) References Cited

U.S. PATENT DOCUMENTS

| 2,484,943 | A |  | 10/1949 | Guise |
| 4,358,058 | A |  | 11/1982 | Bierman |
| 6,354,320 | B1 |  | 3/2002 | Kolacz et al. |
| 8,177,143 | B2 |  | 5/2012 | Laible |
| 9,033,061 | B2 | * | 5/2015 | Chattaway ............. A62C 37/44 169/11 |
| 9,302,133 | B2 | * | 4/2016 | Kluz ...................... A62C 13/64 |
| 2009/0188681 | A1 |  | 7/2009 | Chang |

* cited by examiner

*Primary Examiner* — Davis Hwu
(74) *Attorney, Agent, or Firm* — Lerner, David, Littenberg, Krumholz & Mentlik, LLP

(57) ABSTRACT

A fire extinguishing system is disclosed in which the system comprises a fire extinguisher having an opening, and a valve assembly covering the opening. The valve assembly includes a valve movable from a first position in which the valve seals the opening of the fire extinguisher to a second position in which the valve exposes the opening to allow expulsion of fire suppression material(s) from the fire extinguisher. A release mechanism, which may be in the form of a solenoid or a manual release mechanism, is provided for moving the valve to its open position. Methods of using the aforementioned fire extinguisher to suppress a fire are also disclosed.

19 Claims, 5 Drawing Sheets

METHOD AND MECHANISM FOR FAST EVACUATION OF A PRESSURIZED VESSEL

CROSS-REFERENCE TO RELATED APPLICATIONS

This application is a continuation of U.S. application Ser. No. 14/087,337, filed Nov. 22, 2013, the disclosure of which is incorporated herein by reference.

STATEMENT REGARDING FEDERALLY-SPONSORED RESEARCH OR DEVELOPMENT

This invention was made with government support under contract number W56HZV-13-c-0153, awarded by U.S. Army Contracting Command. The government may have certain rights in the invention.

BACKGROUND OF THE INVENTION

The present invention relates, in general, to a fire extinguishing system, and particularly to an automatic fire extinguishing system (AFES) for use in a vehicle or in other settings.

Typical fire suppression devices comprise a canister of pressurized fire suppression material and a valve. The fire suppression material in the canister may include a propellant, if necessary, to discharge the material. The valve has an outlet port through which the fire suppression material from the canister is discharged. In some cases, the valve includes a mechanism with which to selectively release the fire suppression material through the outlet port (e.g., automatically in response to a fire event, or through manual means).

Fire suppression devices may be used, for example, in certain environments that are subject to risk of exposure to fire (e.g., because of an accident or other disaster). As an example, fire suppression devices have applicability in the military industry. Tanks, Humvees, or other military vehicles may be subject to an attack in which an explosion (e.g., via rupture of a fuel tank or by virtue of an explosive, etc.) causes a fire within and/or surrounding the vehicle. In such cases, a fire suppression device may be automatically or manually activated in response to the fire to assist with putting the fire out and/or lessening its effect on the occupants of the vehicle.

Certain conventional fire suppression devices fail to meet industry needs, however. For instance, within the military field, it is desirable that the fire suppression device actuate within milliseconds of a fire event, that it expel an extinguishing agent(s) in a fast manner, and that the device is adequately sealed to guard against leakage of the extinguishing material(s) over its lifecycle, which in some cases can reach thirty (30) years. The device also typically must require little or no maintenance over its lifetime, and operate with a wide range of power supply systems available. Some fire suppression devices are lacking in one or all of these areas.

It is therefore an objective of the present invention to provide a fire suppression device and valve assembly that improves upon existing devices.

BRIEF SUMMARY OF THE INVENTION

According to a first aspect of the invention, a fire extinguishing system is provided. The system comprises a canister for containing a fire suppression material, the canister having an opening, and a valve assembly having a valve movable from a first position in which the valve seals the opening of the canister to a second position in which the valve exposes the opening to allow expulsion of the fire suppression material from the canister, wherein a release arm restrains the valve from moving to the second position, the release arm being rotatable about an axis to allow the valve to move to the second position, the valve assembly including a release mechanism that, in an unactuated state, prevents rotation of the release arm, and, in an actuated state, allows rotation of the release arm about the axis to move the valve to the second position.

In certain embodiments of this first aspect, the system further comprises one or more sensors, and the release mechanism is an automatic release mechanism that transitions from the unactuated state to the actuated state in response to a signal transmitted by the one or more sensors, the signal being generated after the one or more sensors sense a fire. In addition, the release mechanism may comprise a solenoid having a magnetic solenoid core that moves within a body of the solenoid in response to an electromagnetic force, the solenoid transitioning from the unactuated state to the actuated state in response to an electrical signal sent by the one or more sensors after the one or more sensors sense a fire.

According to a second aspect of the invention, a valve assembly is provided. The assembly comprises a valve having a valve opening and being moveable from a first position in which the valve seals the opening to a second position in which the valve exposes the opening, wherein a release arm restrains the valve from moving to the second position, the release arm being rotatable about an axis to allow the valve to move from the first position to the second position, the valve assembly including a release mechanism that, in an unactuated state, prevents rotation of the release arm, and, in an actuated state, allows rotation of the release arm about the axis to move the valve to the second position.

Some embodiments of this second aspect include a release mechanism that is a solenoid having a magnetic solenoid core, which moves within a body of the solenoid in response to an electromagnetic force, the solenoid transitioning from the unactuated state to the actuated state in response to an electrical signal received by one or more sensors associated with the solenoid.

A third aspect of the invention includes a method of suppressing a fire. The method comprises: (1) providing a fire extinguisher having a canister with an opening and a valve assembly covering the opening, the valve assembly including a valve movable from a first position in which the valve seals the opening of the canister to a second position in which the valve exposes the opening; (2) restraining the valve from moving to the second position by a release arm, the release arm being rotatable about an axis to allow the valve to move to the second position; (3) positioning a release mechanism in an unactuated state to prevent rotation of the release arm and movement of the valve; (4) associating one or more sensors with the release mechanism, the one or more sensors being configured to detect a fire; (5) generating an electrical signal via the one or more sensors in response to a fire, the electrical signal causing the release mechanism to transition from its unactuated state to an actuated state in which the release arm is rotated about the axis and the valve is moved to the second position; and (5) discharging the fire suppression material to suppress the fire. Although the foregoing steps are numbered, no particular order of steps is required and the method may be carried out in an order different than the numbering might imply.

In certain embodiments of this third aspect, the valve assembly may include a manual release mechanism for use in case of failure of the release mechanism. Other features and steps of the third aspect not noted here are also contemplated.

BRIEF DESCRIPTION OF THE DRAWINGS

A more complete appreciation of the subject matter of the present invention and of the various advantages thereof can be realized by reference to the following detailed description in which reference is made to the accompanying drawings in which:

FIG. 3A is a horizontal sectional view through the valve assembly of FIGS. 2A-B, while FIGS. 3A-B illustrate, particularly, the manual-release mechanism and solenoid of the assembly.

DETAILED DESCRIPTION

In describing certain aspects of the present invention, specific terminology will be used for the sake of clarity. However, the invention is not intended to be limited to any specific terms used herein, and it is to be understood that each specific term includes all technical equivalents, which operate in a similar manner to accomplish a similar purpose.

Figure 1:
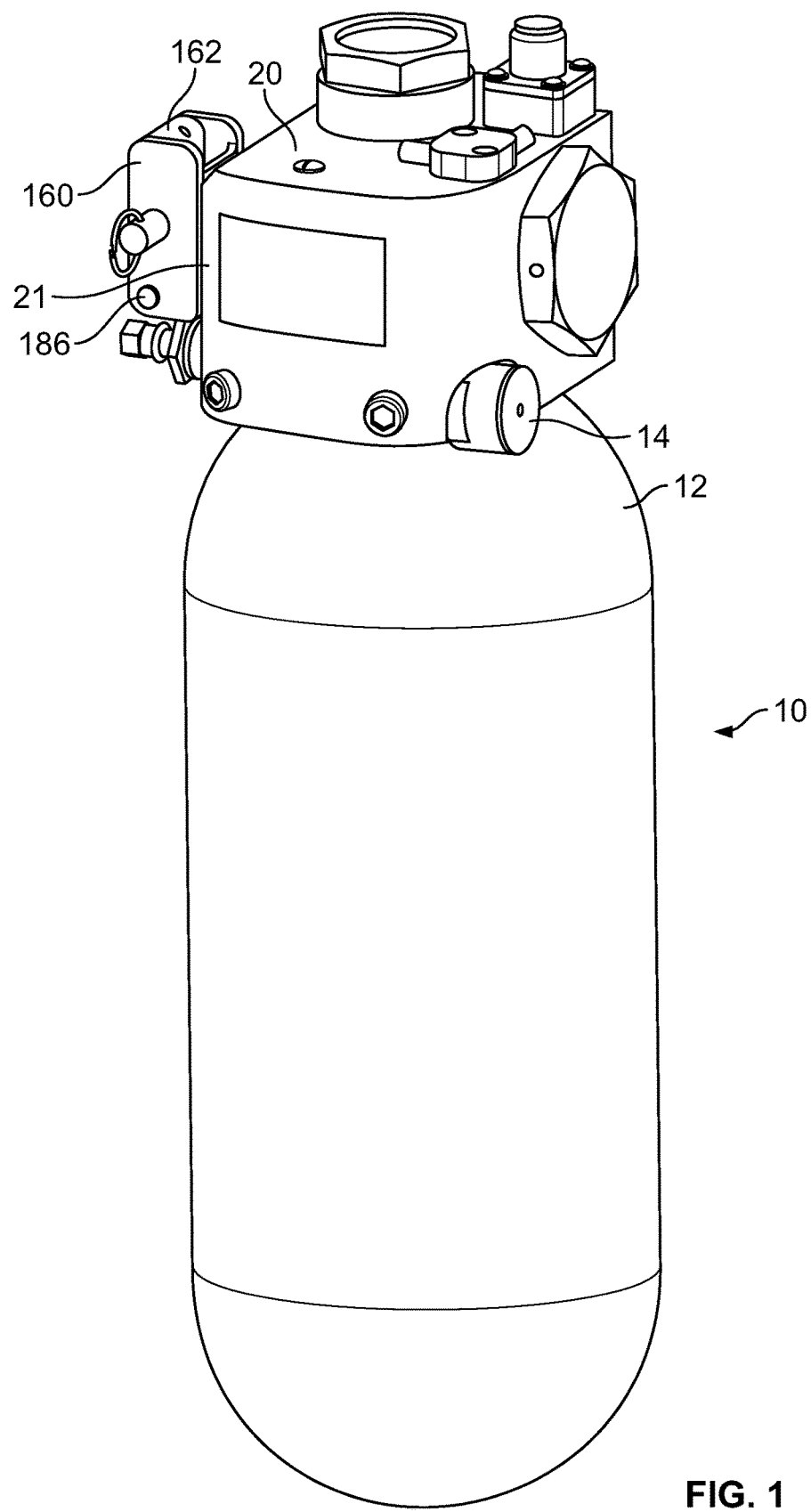
FIG. 1 is a perspective view of a fire extinguishing system utilizing the valve assembly of FIGS. 2A-4.

FIG. 1 depicts an a fire extinguishing system 10, which includes a canister or vessel 12 for housing a fire suppression material(s), and a valve assembly 20 for allowing release of the fire suppression material(s) from canister 12. Any fire suppression material(s) may be utilized with system 10, including but not limited to Halon 1301, HFC 227ea, or any other common material(s) known in the art. Fire extinguishing system 10 may be utilized, for example, in military applications (e.g., in a military vehicle) to suppress and/or put out a fire caused by accident or attack. In this regard, fire extinguishing system 10 may be situated on a wall(s) of the vehicle, or in another suitable location, so that the fire suppression material(s) may be discharged effectively in response to a fire event.

Figure 2A:
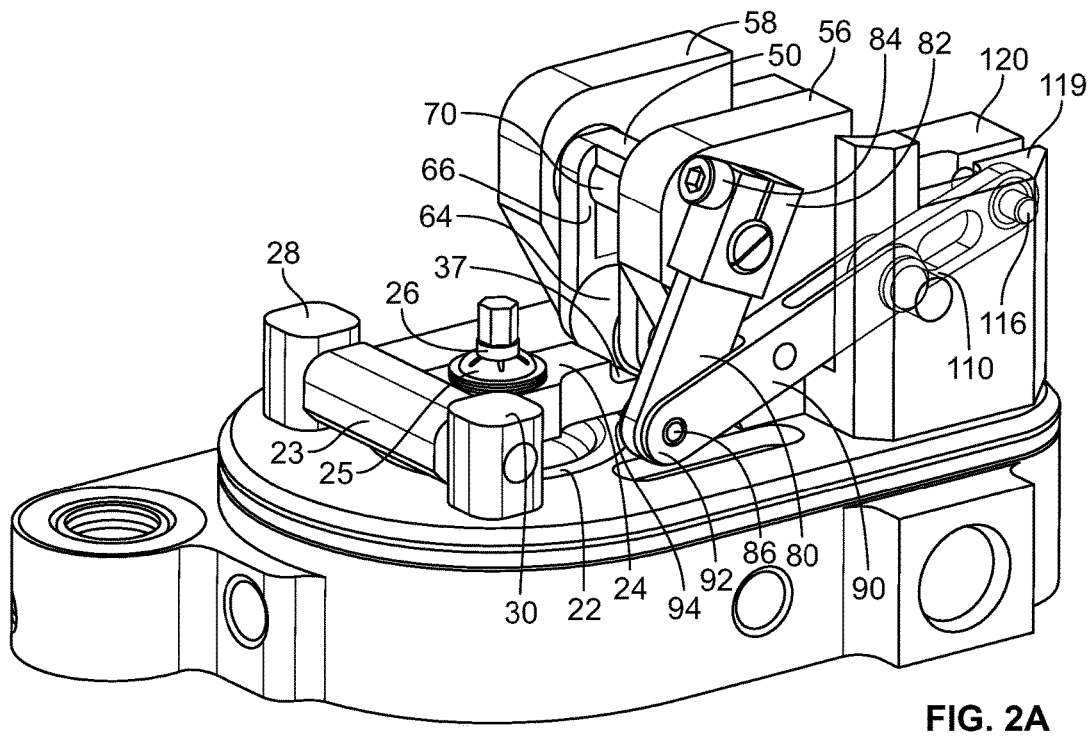
FIGS. 2A-B are perspective views of a valve assembly, in closed and open positions, for use in a fire extinguishing system, such as that shown in FIG. 1.
Figure 3A:
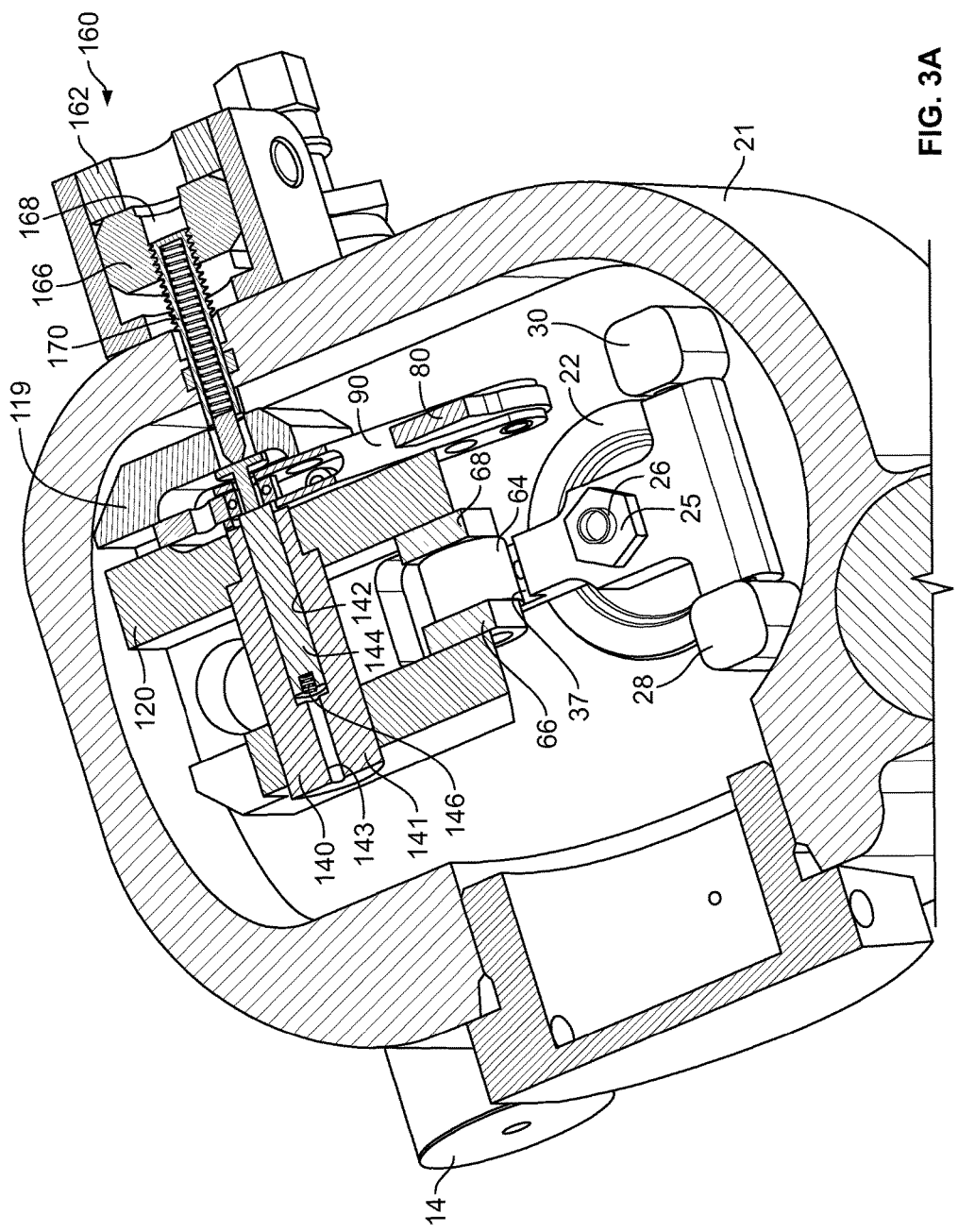
Figure 3B:
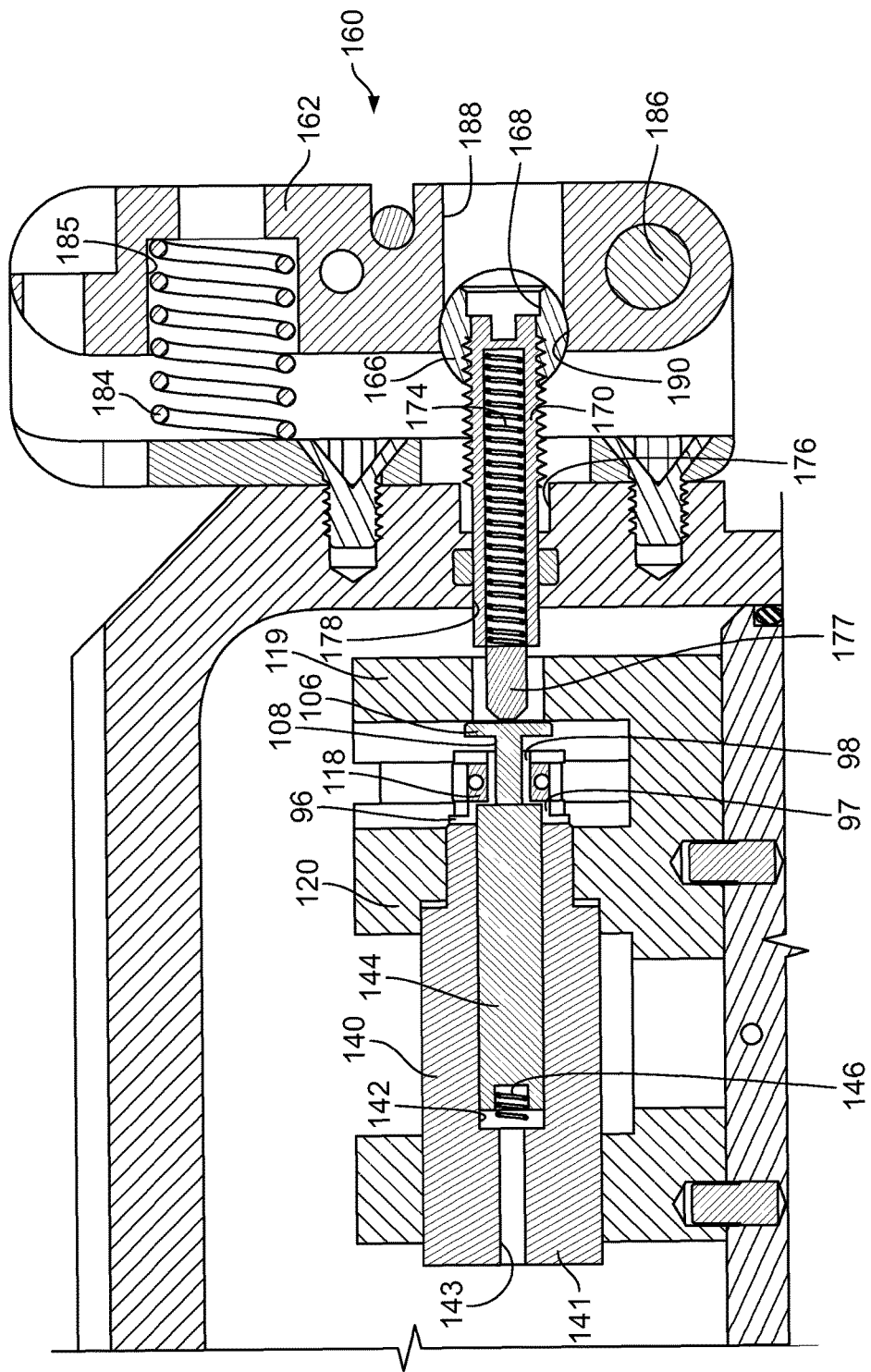
FIG. 3B is a vertical sectional view.
Figure 4:
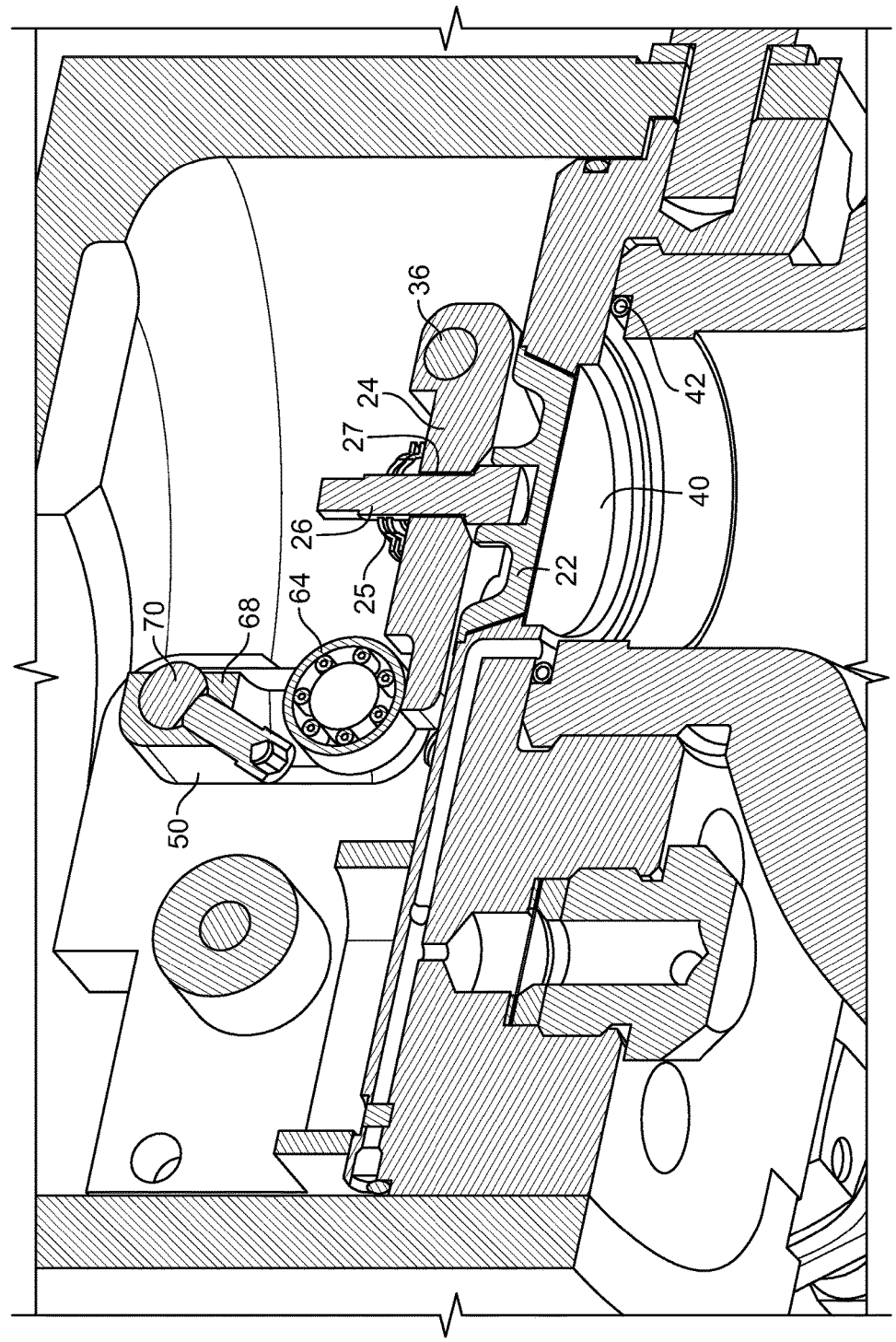
FIG. 4 is a vertical sectional view through the valve assembly and fire extinguisher of FIG. 1.

Valve assembly 20, which forms part of fire extinguishing system 10, is shown in FIGS. 2A-4. Valve assembly 20 may include a housing 21 (FIG. 1), inside of which is a poppet or valve 22, as shown in FIGS. 2A-B. Poppet 22 covers an opening 38 extending through valve assembly 20 and canister 12, which allows release of the fire suppression material(s). Poppet 22 may be in the form of a generally frustoconical disc or cap, which is sized to mate with correspondingly-shaped internal walls of opening 38. To create a leak-tight seal at the juncture of poppet 22 and opening 38, a hermetic seal 40 may be provided therebetween, as shown in FIG. 4. Indeed, in one embodiment, seal 40 may be a thin metal disc welded along its periphery to an internal surface of opening 38. This provides a hermetic, long-life-cycle seal. Alternatively, seal 40 may be glued, brazed, or adhered to opening 38 via other means. This arrangement prevents an uncontrolled rupture of seal 40 and/or ejection of particles forming seal 40 during fast evacuation of canister's 12 contents, as explained in more detail below. In another embodiment, disc 40 may be scored, etched, or otherwise roughened to some depth to assist with controlled rupture.

A seal 42 is also provided at the interface of valve assembly 20 and canister 12 to provide a leak-tight fit therebetween. Seal 42 is, in one embodiment, a metal crush O-ring that seals the body of valve assembly 20 against canister 12. Seal 42, in some cases, may be coated with polytetrafluoroethylene (PTFE).

Figure 2B:
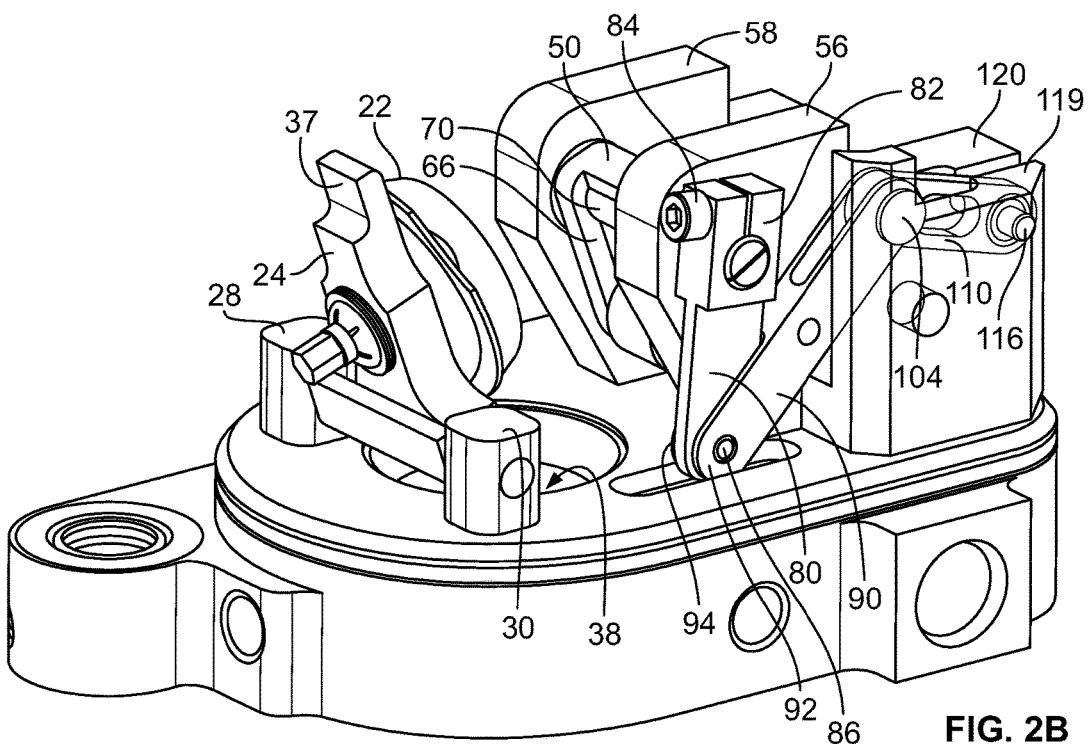

Referring to FIGS. 2A-B, a poppet arm 24 is connected to poppet 22 via at least one bolt 26 inserted through an opening 27 in poppet arm 24. Bolt 26 may be threaded into a recess in poppet 22, as shown in FIG. 4, or alternatively it may extend integrally from poppet 22 through opening 27. A nut 25 may be engaged with bolt 26 to couple poppet 22 to poppet arm 24. In a particular embodiment, poppet arm 24 includes an end 23 having an internal bore (not shown) for receiving a pin 36 (FIG. 4). Pin 36 may extend through the bore in end 23 and into respective openings (not shown) in adjacent posts 28, 30 that surround end 23 of poppet arm 24. Pin 36 may rotate within the respective openings in posts 28, 30, allowing rotation of poppet arm 24 (and thus poppet 22) about pin 36. This is clearly depicted upon examination of the open and closed positions of poppet 22 in FIGS. 2A-B. As such, upon release of the mechanism restraining poppet 22 (described in detail in subsequent sections), poppet 22 and poppet arm 24 may rotate about pin 36 so that the fire suppression material(s) within canister 12 may be released through opening 38.

As shown in FIG. 2A, poppet arm 24 also includes a separate end 37 that is depicted as being flat, but in one embodiment it may also be tapered. Resting on a portion of flat end 37 may be a cam or release arm 50, specifically a cylindrical bearing 64 of release arm 50. Indeed, release arm 50 includes, in one embodiment, a body with opposing extensions 66, 68 that, at one end, include respective openings (not shown) for receiving a portion of a pin inserted through bearing 64. Extension 66 is shown in FIGS. 2A-B, while extension 68 is clearly visible in FIGS. 3A and 4. As an example, bearing 64 may be of the ball-bearing or needle type, which receives a pin for press-fitting into openings (not shown) in extensions 66, 68. Bearing 64 is shown in a sectional view in FIG. 4. In this way, bearing 64 may be rotatable in relation to release arm 50 so that release arm 50 may slide axially along flat end 37 of poppet arm 24. In other words, as bearing 64 is rotatable and connected to release arm 50 via the pin inserted into openings in extensions 66, 68, bearing 64 (and thus release arm 50) may move along flat end 37 of poppet arm 24 without resistance. Bearing 64 may simply allow release arm 50 to roll off of flat end 37 of poppet arm 24, as shown in FIGS. 2A-B.

Release arm 50 may be connected, at an end opposite bearing 64, to adjacent posts 56, 58 via a pin 70. Pin 70 extends, in one embodiment, from post 58, through respective apertures (not shown) in extensions 66, 68, and through post 56 to connect with a first linkage 80. The bores in posts 56, 58 contain bearings (not shown) to facilitate the rotation of pin 70. As such, release arm 50 may rotate about or in conjunction with pin 70 during use, as shown in the progression between FIGS. 2A-2B. In particular, release arm 50 may be connected with pin 70 via a set screw, as shown, for example, in FIG. 4, such that release arm 50 and pin 70 may rotate in conjunction with one another. Such rotation may be as a result of movement of bearing 64 (and thus arm 50) axially along flat end 37 of poppet arm 24. In one embodiment, release arm 50 may be angled by anywhere between approximately one to three degrees (1-3°) to facilitate such movement of bearing 64 along poppet arm 24 (e.g., upon release of poppet 22). Stated differently, release arm 50 may be biased in one direction according to the aforementioned range of angles so as to cause bearing 64 to move easily along flat end 37 of poppet arm 24 in the direction shown in FIG. 2B. This action ultimately causes rotation of release arm 50 about or in conjunction with pin 70 (FIG. 2B). In one embodiment, the amount that release arm 50 is angled or biased in one direction can be altered, for example, by loosening screw 84 incorporated into clamp 82, as shown in FIGS. 2A-B, to allow minor rotation of pin 70 and release arm 50. Angled block gauges may be used to facilitate the angle bias needed. The preset angle of release arm 50 results in a torque on pin 70, which is restrained by mechanical linkage 80.

Referring still to FIGS. 2A-B, a first linkage 80 may be provided with valve assembly 20, as noted above. Linkage 80 includes, in one embodiment, a clamp assembly 82 for receiving pin 70 extending from release arm 50. A bolt or screw 84 secures pin 70 within clamp assembly 82. At an opposite end, an aperture (not shown) is provided in linkage 80 for receiving a pin 86. Pin 86 may extend through the aperture to connect linkage 80 to a second linkage 90 (e.g., allow rotation between linkages 80, 90).

Second linkage 90 is connected to first linkage 80 via pin 86 at one end, and at a separate end to a third linkage 110 via a pin 104. Second linkage 90 includes, in one embodiment, a set of arms 92, 94 through which pins 86, 104 are inserted (e.g., via apertures formed in arms 92, 94). Due to the connection between first and second linkages 80, 90 at pin 86, such linkages 80, 90 may rotate relative to one another about pin 86, as shown, for example, in FIGS. 2A-B. Likewise, second and third linkages 90, 110 may rotate relative to one another about their connection point, pin 104, such that linkages 90, 110 move upwardly during use. It is also notable that the connection points between linkages 80, 90, 110 may move along with rotation of linkages 80, 90, 110 relative to one another, in some cases. An angle relation between linkages 90, 110 is also present to facilitate upward movement. In some cases, the angle between linkages 90, 110 is anywhere between one-hundred seventy seven to one-hundred seventy nine degrees (177-179°).

As shown in FIG. 3B, pin 104 may include a head 106 and a shaft 108 that extends through the apertures in linkages 90, 110. In addition, in some cases a bearing 118 may be utilized at the juncture of linkages 90, 110 to facilitate rotation of the same (e.g., a ball bearing). While only shown in association with the connection between linkages 90, 110, a bearing such as bearing 118 may be utilized at other connections as well (e.g., for linkages 80, 90, etc.) Shaft 108 of pin 104 may extend through bearing 118 and contact a portion of a solenoid 140, in particular its core 144.

While only partially shown in FIGS. 2A-B, a pin 116 may be provided at an end of third linkage 110, which is connected with a portion of a housing 120 for solenoid 140 and a vertically-extending wall 119 positioned adjacent housing 120. For instance, pin 116 may extend into apertures (not shown) in solenoid housing 120 and vertically-extending wall 119. Vertically-extending wall 119 is shown in a transparent view, for example, in FIGS. 2A-B.

Solenoid 140 includes, in one embodiment, a solenoid body 141 having an inner bore with a first, larger diameter section 142 and a second, smaller diameter section 143 (FIGS. 3A-B). Arranged within first, larger diameter section 142 is a solenoid core 144 that can translate within first, larger diameter section 142 in opposing directions. A spring 146 may abut solenoid core 144 and bias core 144 to remain in a condition in which it is spaced apart from the junction between sections 142, 143. Stated differently, due to the resiliency of spring 146 and its positioning, solenoid core 144 may be forced or biased in a direction extending away from the junction between sections 142, 143. Core 144 may longitudinally translate against the force of spring 146, however, to move to a point closer to the junction between sections 142, 143, of course. Once core 144 contacts the step formed between sections 142, 143, translation of core 144 may be prevented.

Referring to FIG. 3B, in one embodiment, the aforementioned translation of core 144 within first, larger diameter section 142 towards second, smaller diameter section 143 may serve to situate core 144 wholly within first, larger diameter section 142. Indeed, in a resting condition, core 144 may extend out from an end of first, larger diameter section 142 and be disposed within, for example, a cap 96 that is arranged within the apertures formed through second and third linkages 90, 110 (i.e., the apertures for the linkages' 90, 110 connection point, pin 104). Cap 96 may include, for instance, a first, larger diameter section 97 for receiving a portion of solenoid core 144, and a second, smaller diameter section 98 extending through the apertures in linkages 90, 110 and being sized to receive a portion of shaft 108 of pin 104. As such, in one embodiment, core 144 may translate out from section 97 of cap 96 so as to be wholly situated within section 142 of solenoid body 141. Once solenoid core 144 moves past the extent of section 97 of cap 96, valve assembly 20 may be actuated and the fire suppression material(s) released from canister 12, as set forth below.

Translation of core 144 of solenoid 140 may occur through a number of different avenues. In one embodiment, solenoid 140 may include an electromagnet (not shown) that, when energized, causes movement of solenoid core 144 against the action of spring 146 and towards smaller diameter section 143 within solenoid body 141. Core 144 may translate within larger diameter section 142 of solenoid body 141 until such a point as core 144 is wholly disposed within section 142 (e.g., no portion of core 144 extends out from section 142). In this regard, the electromagnet may, as with traditional solenoids, be in the form of a wire coil wrapped about a portion of core 144. The coil may be actuated via a small electrical current, which is supplied in response to a fire event (e.g., within milliseconds of the event). As such, the resulting electrical field generated by the electromagnet may act on a portion or all of core 144 (e.g., due to its magnetic properties) and cause core 144 to translate longitudinally within larger diameter section 142 of solenoid body 141. Once the electromagnet is shut off, core 144 may assume its resting position in which it extends out of larger diameter section 142 of solenoid body 141 by some predetermined amount.

As an alternative, a manual release mechanism 160 may be used to translate solenoid core 144 within larger diameter section 142 of solenoid body 141. Manual release mechanism 160 can be used, for instance, when an electrical failure occurs inside the military vehicle. Manual release mechanism 160 may comprise an actuator 162 arranged to abut a spring 184 that biases actuator 162 outwards and/or serves to situate actuator 162 in a particular resting orientation. Spring 184 may be arranged within a recess 185 formed in actuator 162. In some embodiments, actuator 162 may be a lever that is pulled downwards, depressed, rotated, or otherwise moved (e.g., about a pin 186 as shown, for example, in FIGS. 1 and 3B) to cause actuation of manual release mechanism 160. Referring to FIG. 3A, actuator 162 may also be arranged adjacent to and contact a cylindrical ring 166 that, in one embodiment, includes an at least partially threaded internal bore 168. Ring 166, as shown in FIG. 3B, is situated within an aperture 188 formed in actuator 162, and specifically a spherical seat 190 within aperture 188 that is shaped to match an outer surface of ring 166.

A shaft 170 is included with manual release mechanism 160, in one embodiment, and is arranged to extend into valve assembly's housing 21 (e.g., to actuate valve assembly 20). Shaft 170 is externally threaded along at least a portion thereof, and is screwed into the internally threaded portion of inner bore 168 of cylindrical ring 166. Shaft 170 may also include an inner bore 172 that houses a spring 174. Shaft 170 may be closed at one end, such that spring 174 abuts shaft's 170 closed end. Spring 174 may extend along a majority of the extent of bore 172, until it meets with a post 177 that is arranged at least partially within bore 172. Post 177 slides axially within bore 172 against the force of spring 174.

In one embodiment, shaft 170 extends outwards from cylindrical ring 166, through a first, larger diameter aperture 176 in valve assembly housing 21, and then through a second, smaller diameter aperture 178 in housing 21. Smaller diameter aperture 178 may roughly be sized to accommodate the non-threaded portion of shaft 170, while larger diameter aperture 176 may roughly be sized to accommodate the externally threaded portion of shaft 170.

As shown in FIGS. 3A-B, post 177 may abut head 106 of pin 104, which in turn contacts solenoid core 144. Thus, upon the application of a predetermined amount of force on head 106 via post 177, solenoid core 144 may be manually translated within larger diameter section 142 of solenoid body 141 so that core 144 is moved wholly within section 142. In this respect, a user may actuate actuator 162 (e.g., a user may depress actuator 162 about pin 186), such that actuator 162 moves against the force of spring 184, subsequently causing movement of cylindrical ring 166 and its connected shaft 170. As shaft 170 is moved towards valve assembly housing 21 and within larger diameter bore 176 (e.g., via the connection between ring's 166 threading and shaft's 170 threading), the closed end of shaft 170 may act against spring 174, which in turn may apply a force against post 177. Once shaft 170 is moved a predetermined distance, a force will be generated by spring 174 against post 177 that is sufficient to overcome, inter alia, the frictional forces of core 144 against larger diameter section 142 (if any) and the force applied against core 144 by its opposing spring 146. Then, post 177 may act on pin 104 to move solenoid core 144 within larger diameter section 142 of solenoid body's 141 internal bore. This may cause release of valve assembly 20 and discharge of the fire suppression material(s), as detailed below. In a particular embodiment, springs 146, 174 may be selected such that the application of anywhere between approximately ten (10) to approximately twenty six (26) pounds of force, applied over a quarter inch (0.25 in) of travel for actuator 162, results in movement of shaft 174 a sufficient distance to actuate manual release mechanism 160. This range may be changed, of course, through selection of springs 146, 174 with different spring constants, or through other means.

It is also possible to modify the aforementioned force required to trigger manual release mechanism 160 by manually adjusting shaft 174. For instance, as shown in FIG. 3B, shaft 174 may include a fitting at one end that can engage with a tool (not shown) for rotating shaft 170 and causing it to translate either out of or within cylindrical ring 166 (e.g., via the threading of both shaft 170 and ring 166). The fitting may be accessed via aperture 188 in actuator 162. Thus, if over time the elasticity of spring 174 were to change (e.g., lessen), one could simply manually adjust shaft 174 by rotating the same through its fitting to cause shaft 174 to move out of cylindrical ring 166 to some degree, thereby compressing spring 174 to a certain extent so as to restore manual release mechanism 160 to its initially-set release values.

Use of fire extinguishing system 10 in the context of military applications will now be described. Although fire extinguishing system 10 is described in connection with a military vehicle, it is contemplated that system 10 may be usable in other vehicles and/or other enclosed environments (e.g., a testing-room facility or other closed-room space where fire suppression is a concern, etc.)

In use, fire extinguishing system 10 may be positioned along a wall(s) of a vehicle, such as a Humvee or other military vehicle. These particular vehicles are susceptible to attack and/or accident, in which case fire suppression is of paramount concern for the occupants. With fire extinguishing system 10 positioned within the vehicle (e.g., through the use of a mount provided with and/or on system 10 or included with the vehicle), fire extinguishing system 10 may be poised for actuation in response to a fire event. In particular, referring to FIGS. 2A-B, poppet 22 and poppet arm 24 may be in a closed position (FIG. 2A) preventing release of the fire suppression material(s) from canister 12. A tight seal may be formed between poppet 22 and opening 38 via seal 40. In addition, seal 42 in the form of, for example, an O-ring is also utilized at the interface of valve assembly 20 and canister 12 to create a leak-tight seal therebetween. As such, with the particular configuration of seals 40, 42, minimal or no amount of material leaks from canister 12, thereby increasing the lifespan of system 10.

As noted previously, when in the closed position (FIG. 2A), release arm 50 overlies flat end 37 of poppet arm 24 to restrain poppet 22 from opening and releasing the fire suppression material(s) from canister 12. Indeed, in one embodiment, bearing 64 directly contacts flat end 37 of poppet arm 24. Release arm 50 may also be angled in a manner that facilitates release of poppet 22 and exposure of opening 38 through valve assembly 20 and canister 12. For instance, release arm 50 may be angled away from opening 38 by about anywhere between one to three degrees (1-3°) so that, upon actuation of solenoid 140 and/or manual release mechanism 160, release arm 50 is preconfigured to move axially along flat end 37 of poppet arm 24 away from opening 38. In other words, release arm 50 may be pre-angled in the direction it rotates during use (FIG. 2B) by some amount so that, upon actuation of solenoid 140 and/or manual release mechanism 160, release arm 50 may be predisposed to move or rotate along flat end 37 of poppet arm 24 via bearing 64. Thus, system 10 may be preconfigured to cause movement of release arm 50 (and therefore linkages 80, 90, 110) to allow release of poppet arm 24 and poppet 22, which causes exposure of opening 38.

The particular event that triggers actuation of valve assembly 20 to release the fire suppression material(s) is, in one embodiment, actuation of solenoid 140 and/or manual release mechanism 160 in response to a fire event. With reference to solenoid 140, as shown in FIGS. 3A-B, one or more sensors associated with fire extinguishing system 10 (not shown) may sense that a fire event has occurred (e.g., an attack on the military vehicle, triggering an explosion), at which point the sensor(s) may send, within milliseconds, an electrical current to solenoid 140 to actuate solenoid 140. Until such a point, fire extinguishing system 10 may be held in a static state by virtue of the fact that solenoid core 144 extends a particular distance out from larger diameter section 142 of solenoid body 141 and into cap 96. Cap 96 (and in particular its shaft 98) extends into the apertures in linkages 90, 110 so that the same are prevented from moving via an interference between solenoid core 144, cap 96, and linkages 90, 110. Once a fire event is sensed, however, as described above, an electric current is transferred immediately to solenoid 140 to cause solenoid core 144 to move against the action of spring 146 and into larger diameter section 142 of solenoid body 141. In a particular embodiment, the magnetic field generated by the electromagnet used with solenoid 140 causes movement of its core 144. Once solenoid core 144 travels entirely within larger diameter section 142 (or alternatively past the extent of cap 96), core 144 may disengage from cap 96, thereby freeing linkages 90, 110 from restraint.

Prior to actuation of solenoid 140, pressure from within canister 12 (e.g., via the compressed fire suppression material(s) within canister 12) constantly acts upon poppet 22 attempting to force the same open and allow release of the fire suppression material(s). Yet, without solenoid 140 activated, system 10 remains static and release arm 50 acts to prevent movement of poppet 22. With linkages 90, 110 free to move at will after actuation of solenoid 140, as detailed above, and release arm 50 biased away from opening 38 through valve assembly 20 and canister 12, release arm 50 may be rotated away from opening 38 about or in conjunction with its pin 70 by the upward force of poppet arm 24 on bearing 64. Indeed, with the system 10 free to move after actuation of solenoid 140, the upward force borne on poppet 22 and poppet arm 24 via the compressed fire suppression material(s) within canister 12 may be transferred to bearing 64, which may simply rotate along flat end 37 of poppet arm 24 causing release arm 50 to pivot about or in conjunction with its pin 70 to open poppet 22 and opening 38 (e.g., as shown in the progression between FIGS. 2A-B). During this action, linkages 80, 90, 110 may rotate relative to one another about their respective connection points, pins 86, 104, 116, in the manner shown in FIGS. 2A-B. In addition, rotation of pin 70 during this action may likewise cause rotation of linkage 80 (e.g., due to its connection with clamp 82), as well as assist with corresponding rotation of linkages 90, 110 about pins 86, 104, 116. In other words, rotation of pin 70 causes rotation of linkage 80 and corresponding movement of the remainder of linkages 90, 110 due to their respective connections.

The sensing of a fire event by the one or more sensors associated with fire extinguishing system 10 may therefore create an immediate response to the event and allow release of fire suppression material(s) to protect, for example, the occupants of a military vehicle. As an example, the one or more sensors sense a fire event and relay an electric current to solenoid 140, causing release of poppet 22 and the fire suppression material(s) within milliseconds of detecting a fire. In one embodiment, fire extinguishing system 10 reacts within a time frame of ten milliseconds (10 ms) from the point at which an activation signal is sent. In addition, once activated, the contents of canister 12 may be released in a rapid manner so that the fire is effectively suppressed. For instance, two-hundred milliseconds (200 ms) after receiving a release signal, the pressure within canister 12 may be no greater than about thirty six percent (36%) of its initial value.

As an alternative actuation mechanism allowing release of fire suppression material(s) from fire extinguishing system 10 (e.g., in the case of an electrical failure), one may use manual release mechanism 160. For example, if there is an unexpected electrical failure, an occupant of the vehicle simply depresses actuator 162 to trigger release of poppet 22 and the fire suppression material(s) within canister 12. In particular, as shown in FIGS. 3A-B, depression of actuator 162 causes movement of shaft 170 connected to cylindrical ring 166. Shaft 170 may therefore act against spring 174 disposed within shaft 170. With the application of a predetermined amount of force by the user against actuator 162 (e.g., in an amount of anywhere between approximately ten (10) to approximately twenty six (26) pounds of force, applied over a quarter inch (0.25 in) of travel for actuator 162), enough force is borne on spring 174 to cause post 177 to shift pin 104 axially against solenoid core 144 and move core 144 wholly within larger diameter section 142 of solenoid body 141 (or alternatively past the extent of cap 96). In this respect, the use of spring 174 may ensure that an accidental bump of actuator 162 does not cause triggering of fire extinguishing system 10. Instead, enough force must be applied to actuator 162 (and therefore spring 174 and post 177) to cause solenoid core 144 to move and the system 10 to be actuated. In other words, since there is not a direct connection between shaft 170 and post 177, and rather they are connected via a spring mechanism 146, more than just a minimal amount of force is required to actuate manual release mechanism 160. This provides a safeguard against accidental triggering of release mechanism 160.

Once post 177 causes pin 104 and solenoid core 144 to move a sufficient distance, fire extinguishing system 10 may be actuated in the manner described above (i.e., in the same manner as when an electrical failure has not occurred and solenoid 140 is in use). Thus, upon actuation of manual release mechanism 160, poppet 22 and poppet arm 24 may be released, as shown in FIGS. 2A-B, and opening 38 may be exposed. Indeed, release arm 50 may rotate about or in conjunction with its pin 70 once flat end 37 of poppet arm 24 causes bearing 64 to roll along poppet arm 24. Then, linkages 80, 90, 110 rotate relative to one another as discussed above so as to allow poppet 22 and poppet arm 24 to swing open, as shown in FIG. 2B, and expose opening 38 through valve assembly 20 and canister 12. The fire suppression material(s) within canister 12 is then released through opening 38 and rapidly dispersed within the military vehicle.

It is also worthwhile to note that, in releasing fire suppression material(s), it is desirable that fire extinguishing system 10 not throw off any debris of an appreciable size, as such debris may injure an occupant of the vehicle. For this reason, seal 40 that seals the juncture between poppet 22 and opening 38 is composed of a thin metal disc that is adhered both to a bottom surface of poppet 22 and along its periphery (e.g., via welding, brazing, and/or gluing) to at least a portion of an internal wall of opening 38. In this manner, once poppet 22 is flung open by the pressure of the fire suppression material(s) in canister 12, causing poppet 22 to rotate out of opening 38, rapid shearing of seal 40 (e.g., in the form of a metal disc) occurs at seal's 40 periphery. In addition, since the periphery of seal 40 is bonded to an internal surface of opening 38, no portion of seal 40 is expelled from opening 38 once poppet 22 is released. Stated differently, due to the construction of seal 40, no portion of it is thrown from opening 38 at an alarming rate when poppet 22 is released, which might cause that portion to form a projectile capable of injuring, for example, one of the occupants of the vehicle. Rather, a large extent of seal 40 remains on the underside of poppet 22 once poppet 22 is released, while the sheared periphery of seal 40 remains on the internal walls of opening 38 (e.g., because seal 40 is firmly welded, brazed, and/or glued to such structures). As such, seal 40 not only provides a leak-tight closure, but does so without creating a risk that seal 40 could form an injuring projectile during operation of fire extinguishing system 10. In an alternate embodiment, seal 40 is not glued or adhered to the underside of poppet 22, but rather is secured only at its periphery to an internal surface of opening 38 and is scored or etched with a geometric pattern, which also results in a controlled and particle-free burst of seal 40. In other words, alternate methods of providing a controlled and particle-free burst for seal 40 are contemplated, such as that discussed in the preceding embodiment.

In the devices depicted in the figures, particular structures are shown that are adapted for use in fire extinguishing system. The use of alternative structures for such purposes, including structures having different lengths, shapes, and configurations is also contemplated. As an example, although solenoid 140 is shown and described as providing an automatic release mechanism, other automatic release mechanisms may also be used in the place of solenoid 140, such as a mechanism acting as a fast-relief valve, which can be actuated by means of a pneumatic signal resulting from over pressurization of the tank.

In addition, although certain structures have been described as using multiple parts, integral or monolithic structures may be used instead. For instance, poppet arm 24 and poppet 22, while described and shown as separate structures, may alternatively be an integral or monolithic structure. Indeed, poppet 22 and its arm 24 may be unitary and rotatable about pin 36. As another example, although a particular seal 40 in the form of a metal disc has been described herein, other seals may be used to seal the juncture between poppet 22 and opening 38. For example, the following types of seals might be used with system 10: a crushed metal seal, the disc can be crushed between canister 12 and poppet 22, or the disc can be polytetrafluoroethylene (PTFE) or coated with another polymer to provide better leakage properties.

Although aspects of the invention herein have been described with reference to particular embodiments, it is to be understood that these embodiments are merely illustrative of certain features of the present invention. It is therefore to be understood that numerous modifications may be made to the illustrative embodiments and that other arrangements may be devised without departing from the spirit and scope of the present invention as defined by the appended claims. For instance, the features described in connection with individual embodiments may be shared with others of the described embodiments.

It will also be appreciated that the various dependent claims and the features set forth therein can be combined in different ways than presented in the initial claims.

The invention claimed is:

1. A fire extinguishing system comprising:
a canister for containing a fire suppression material, the canister having an opening;
a valve assembly having a valve movable from a first position in which the valve seals the opening of the canister to a second position in which the valve exposes the opening to allow expulsion of the fire suppression material from the canister, the valve assembly including a release mechanism that, in an unactuated state, prevents movement of the valve from its first position to its second position, and, in an actuated state, allows movement of the valve to the second position; and
a valve arm engaged with said valve, said valve arm being movable with said valve to said second position, and said release mechanism including a release arm contacting a portion of said valve arm when said release mechanism is in said unactuated state to prevent said valve arm and said valve from moving to said second position.

2. The system of claim 1, wherein the release arm disengages from the valve arm when the release mechanism is in the actuated state to allow movement of the valve arm and valve to the second position, the release arm disengaging from the valve arm through rotation of the release arm about the axis.

3. The system of claim 1, further comprising one or more sensors, wherein the release mechanism is an automatic release mechanism that transitions from the unactuated state to the actuated state in response to a signal transmitted by the one or more sensors, the signal being generated after the one or more sensors sense a fire.

4. The system of claim 3, wherein the release mechanism comprises a solenoid having a magnetic solenoid core that moves within a body of the solenoid in response to an electromagnetic force, the solenoid transitioning from the unactuated state to the actuated state in response to an electrical signal sent by the one or more sensors after the one or more sensors sense a fire.

5. The system of claim 4, further comprising one or more linkages linking the release arm to the release mechanism, the one or more linkages being movable about respective connection points, at least one of which is static when the release mechanism is in the unactuated stated, wherein movement of the solenoid core in response to the electrical signal frees the at least one static connection point to allow movement of the one or more linkages and rotation of the release arm about the axis.

6. The system of claim 1, wherein the release mechanism is a manual release mechanism.

7. The system of claim 6, wherein the manual release mechanism includes a movable actuator and the system includes one or more linkages, the linkages being movable relative to one another about respective connection points, at least one of the connection points being held static while the release mechanism is in the unactuated state, and being freely movable upon movement of the actuator to place the release mechanism in the actuated state.

8. The system of claim 6, wherein the one or more linkages link the release arm to the release mechanism.

9. The system of claim 1, wherein the valve assembly includes an opening in communication with the opening of the canister, and a seal is arranged to seal the opening in the valve assembly, the seal having a surface that is etched with a geometric pattern to assist with providing a controlled, substantially particle-free rupture of the seal during use.

10. A valve assembly comprising:
a valve having a valve opening and being moveable from a first position in which the valve seals the opening to a second position in which the valve exposes the opening, wherein a release arm restrains the valve from moving to the second position, the release arm being rotatable about an axis to allow the valve to move from the first position to the second position, the valve assembly including a release mechanism that, in an unactuated state, prevents rotation of the release arm, and, in an actuated state, allows rotation of the release arm about the axis to move the valve to the second position, wherein said valve includes a valve arm that is movable with said valve to said second position, said release arm contacting a portion of said valve arm when said release mechanism is in said unactuated state to prevent said valve arm and said valve from moving to said second position.

11. The valve assembly of claim 10, wherein the release arm disengages from the valve arm when the release mechanism is in the actuated state to allow movement of the valve arm and valve to the second position, the release arm disengaging from the valve arm through rotation of the release arm about the axis.

12. The valve assembly of claim 11, wherein the release arm is biased to automatically disengage from the valve arm upon actuation of the release mechanism.

13. The valve assembly of claim 10, wherein the release mechanism comprises a solenoid having a magnetic solenoid core that moves within a body of the solenoid in response to an electromagnetic force, the solenoid transitioning from the unactuated state to the actuated state in response to an electrical signal received by one or more sensors associated with the solenoid.

14. The valve assembly of claim 13, further comprising one or more linkages linking the release arm to the release mechanism, the one or more linkages being movable about respective connection points, at least one of which is static when the release mechanism is in the unactuated stated, wherein movement of the solenoid core in response to the electrical signal frees the at least one static connection point to allow movement of the one or more linkages and rotation of the release arm about the axis.

15. The valve assembly of claim 10, further comprising a seal arranged to seal the valve opening, the seal having a surface that is etched with a geometric pattern to assist with providing a controlled, substantially particle-free rupture of the seal during use.

16. A fire extinguishing system comprising:
a canister for containing a fire suppression material, the canister having an opening; and
a valve assembly having a valve movable from a first position in which said valve seals the opening of the canister to a second position in which the valve exposes the opening to allow expulsion of the fire suppression material from said canister, the valve assembly including a release mechanism that, in an unactuated state, prevents movement of the valve from its first position to its second position, and in an actuated state allows rapid movement of the valve by means of said bias to the second position, said valve including a valve arm that is movable with the valve to the second position, the release mechanism contacting a portion of the valve arm when the release mechanism is in the unactuated state to prevent the valve arm and the valve from moving to the second position.

17. The system of claim 16, wherein the release mechanism disengages from the valve arm when the release mechanism is in the actuated state to allow movement of the valve arm and the valve to the second position, the release mechanism disengaging from the valve arm through rotation of the release mechanism about the axis.

18. A fire extinguishing system comprising:
a canister for containing a fire suppression material, the canister having an opening; and
a valve assembly having a valve movable from a first position in which said valve seals the opening of the canister to a second position in which the valve exposes the opening to allow expulsion of the fire suppression material from said canister, the valve assembly including a release mechanism that, in an unactuated state, prevents movement of the valve from its first position to its second position, and in an actuated state allows rapid movement of the valve by means of said bias to the second position, wherein the release mechanism comprises a solenoid having a magnetic solenoid core that moves within a body of the solenoid in response to an electromagnetic force and is capable of transitioning from the unactuated state to the actuated state in response to a signal transmitted by one or more sensors further comprising one or more linkages linking the release arm to the release mechanism, the one or more linkages being movable about respective connection points, at least one of which is static when the release mechanism is in the unactuated stated, wherein movement of the solenoid core in response to the electrical signal frees the at least one static connection point to allow movement of the one or more linkages and rotation of the release arm about the axis.

19. A fire extinguishing system comprising:
a canister for containing a fire suppression material, the canister having an opening; and
a valve assembly having a valve movable from a first position in which said valve seals the opening of the canister to a second position in which the valve exposes the opening to allow expulsion of the fire suppression material from said canister, the valve assembly including a release mechanism that, in an unactuated state, prevents movement of the valve from its first position to its second position, and in an actuated state allows rapid movement of the valve by means of said bias to the second position, wherein the release mechanism is a manual release mechanism which includes a movable actuator and the system includes one or more linkages, the linkages being movable relative to one another about respective connection points, at least one of the connection points being held static while the release mechanism is in the unactuated state, and being freely movable upon movement of the actuator to place the release mechanism in the actuated state.

* * * * *